(12) United States Patent
Park et al.

(10) Patent No.: US 10,050,251 B2
(45) Date of Patent: Aug. 14, 2018

(54) SECONDARY BATTERY PACK OF COMPACT STRUCTURE

(71) Applicant: LG CHEM, LTD., Seoul (KR)

(72) Inventors: Youngsun Park, Daejeon (KR);
Jeongsuk Lee, Cheongju-si (KR);
Keunpyo Ahn, Cheongju-si (KR);
Chunyeon Kim, Cheongwon-gun (KR);
Joung Ho Ha, Cheongwon-gun (KR);
Masayuki Wakebe, Cheongwon-gun (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/327,116

(22) Filed: Jul. 9, 2014

(65) Prior Publication Data
US 2014/0363703 A1 Dec. 11, 2014

Related U.S. Application Data

(62) Division of application No. 12/745,508, filed as application No. PCT/KR2008/006981 on Nov. 27, 2008, now Pat. No. 8,808,883.

(30) Foreign Application Priority Data

Nov. 29, 2007 (KR) .................. 10-2007-0122613
Nov. 29, 2007 (KR) .................. 10-2007-0122970

(51) Int. Cl.
*H01M 2/34* (2006.01)
*H01M 10/42* (2006.01)
(Continued)

(52) U.S. Cl.
CPC ......... *H01M 2/348* (2013.01); *H01M 2/0404* (2013.01); *H01M 2/0408* (2013.01);
(Continued)

(58) Field of Classification Search
None
See application file for complete search history.

(56) References Cited

U.S. PATENT DOCUMENTS

| 5,707,756 A | 1/1998 | Inoue et al. |
| 6,492,058 B1 | 12/2002 | Watanabe et al. |

(Continued)

FOREIGN PATENT DOCUMENTS

| CN | 1385908 A | 12/2002 |
| CN | 1599093 A | 3/2005 |

(Continued)

*Primary Examiner* — Ula C Ruddock
*Assistant Examiner* — Amanda Barrow
(74) *Attorney, Agent, or Firm* — Birch, Stewart, Kolasch & Birch, LLP

(57) ABSTRACT

Disclosed herein is a secondary battery pack including a battery cell having an electrode assembly mounted in a battery case together with an electrolyte, a protection circuit module (PCM) having a protection circuit for controlling overcharge, overdischarge, and overcurrent of the battery cell, an insulative mounting member mounted to a top cap of the battery cell, and an insulative cap coupled to the upper end of the battery cell, wherein the top cap is provided with at least one protrusion-type electrode terminal, and the top cap is provided at a partial region where the protrusion-type electrode terminal is not formed with a space (depression space) depressed downward by a predetermined depth. The insulative mounting member is provided with a through-hole (a first through-hole) corresponding to the protrusion-type electrode terminal and a through-hole (a second through-hole) corresponding to the depression space, the PCM is provided with a coupling through-hole corresponding to the first through-hole, and the coupling of the insulative mounting member and the PCM to the battery cell is achieved by successively fixedly inserting the protrusion- (Continued)

type electrode terminal through the first through-hole of the insulative mounting member and the coupling through-hole of the PCM.

4 Claims, 10 Drawing Sheets

(51) Int. Cl.
    *H01M 2/04*         (2006.01)
    *H01M 2/10*         (2006.01)
    *H01M 2/30*         (2006.01)

(52) U.S. Cl.
    CPC ........... *H01M 2/1061* (2013.01); *H01M 2/30* (2013.01); *H01M 2/34* (2013.01); *H01M 10/425* (2013.01); *H01M 2200/106* (2013.01); *H01M 2220/30* (2013.01)

(56) References Cited

U.S. PATENT DOCUMENTS

| | | | |
|---|---|---|---|
| 7,037,608 B2 | 5/2006 | Nishimura et al. | |
| 2003/0077486 A1* | 4/2003 | Iwaizono | H01M 10/42 |
| | | | 429/7 |
| 2004/0170887 A1* | 9/2004 | Masumoto | H01M 2/0404 |
| | | | 429/61 |
| 2005/0053827 A1 | 3/2005 | Watanabe et al. | |
| 2005/0140338 A1 | 6/2005 | Kim et al. | |
| 2005/0153195 A1* | 7/2005 | Han | H01M 2/0404 |
| | | | 429/59 |
| 2005/0208346 A1 | 9/2005 | Moon et al. | |
| 2005/0266279 A1* | 12/2005 | Kim | H01M 2/12 |
| | | | 429/7 |
| 2006/0019160 A1 | 1/2006 | Han | |
| 2006/0019531 A1 | 1/2006 | Moon | |
| 2007/0154796 A1 | 7/2007 | Uh | |
| 2007/0232123 A1 | 10/2007 | Uh | |
| 2009/0317715 A1* | 12/2009 | Jung | H01M 2/0215 |
| | | | 429/179 |
| 2011/0070465 A1 | 3/2011 | Kim | |
| 2011/0070466 A1 | 3/2011 | Park et al. | |

FOREIGN PATENT DOCUMENTS

| | | | |
|---|---|---|---|
| JP | 8-153536 A | 6/1996 | |
| JP | 8-163536 A | 6/1996 | |
| JP | 2000-311667 A | 11/2000 | |
| JP | 2002-334685 | * 11/2002 | .............. H01M 2/04 |
| JP | 2002-334685 A | 11/2002 | |
| JP | 2003-168419 A | 6/2003 | |
| JP | 2004-178994 A | 6/2004 | |
| JP | 2010-537368 A | 12/2010 | |
| KR | 10-2005-0060187 A | 6/2005 | |
| KR | 10-2007-0097143 A | 10/2007 | |

\* cited by examiner

SECONDARY BATTERY PACK OF COMPACT STRUCTURE

CROSS-REFERENCE TO RELATED APPLICATIONS

This application is a Divisional of co-pending U.S. application Ser. No. 12/745,508, filed on Nov. 24, 2010, which is the National Phase of PCT International Application No. PCT/KR2008/006981 filed on Nov. 27, 2008, which claims priority under 35 U.S.C. 119(a) to Patent Application Nos. 10-2007-122613 filed in the Republic of Korea on Nov. 29, 2007, and 10-2007-0122970 filed in the Republic of Korea on Nov. 29, 2007. The entire contents of all of the above applications are hereby expressly incorporated by reference.

FIELD OF THE INVENTION

The present invention relates to a secondary battery pack of a compact structure, and, more particularly, to a secondary battery pack including a battery cell, a protection circuit module (PCM), an insulative mounting member, and an insulative cap, wherein the top cap is provided with at least one protrusion-type electrode terminal and a depression space depressed downward by a predetermined depth, the insulative mounting member is provided with a through-hole (a first through-hole) corresponding to the protrusion-type electrode terminal and a through-hole (a second through-hole) corresponding to the depression space, the PCM is provided with a coupling through-hole corresponding to the first through-hole, and the coupling of the insulative mounting member and the PCM to the battery cell is achieved by successively fixedly inserting the protrusion-type electrode terminal through the first through-hole of the insulative mounting member and the coupling through-hole of the PCM.

BACKGROUND OF THE INVENTION

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the secondary batteries have attracted considerable attention as an energy source for electric vehicles and hybrid electric vehicles, which have been developed to solve problems, such as air pollution, caused by existing gasoline and diesel vehicles using fossil fuel. As a result, kinds of applications using the secondary batteries are being diversified owing to advantages of the secondary batteries, and hereafter the secondary batteries are expected to be applied to more applications and products than now.

However, various combustible materials are contained in the lithium secondary battery. As a result, there is a possibility of danger in that the lithium secondary battery will be heated or explode due to overcharge, overcurrent, or any other external physical impacts. In other words, the lithium secondary battery has low safety. For this reason, a method of mounting elements outside a cell to secure the safety of the battery is under discussion. The elements may include a protection circuit module (PCM) for effectively controlling the abnormality of the lithium secondary battery, such as overcharge, a positive temperature coefficient (PTC) element and a circuit interruption device (CID) element using the change in temperature of the battery, and a safety vent using the change in internal pressure of the battery.

The PCM includes a field effect transistor (FET), which serves as a switching element for controlling electric current conduction, a voltage detector, and passive elements such as a resistor and a capacitor. The PCM interrupts overcharge, overdischarge, overcurrent, short circuits, and reverse voltage of the battery cell to prevent the explosion or the overheating of the battery cell, the leakage of liquid from the battery cell, and the degradation of the charge and discharge characteristics of the battery cell, and to suppress the lowering of the electrical efficiency of the battery cell and the abnormal physicochemical behavior of the battery cell, thereby eliminating dangerous factors from the battery cell and increasing the service life of the battery cell. The PTC element is electrically connected between an electrode assembly of the battery cell and an external input and output terminal such that, at a temperature at which the battery cell normally operates, the PCT element maintains low resistance to allow electric current to flow therethrough, and, in an abnormal state, such as overcurrent or high temperature, of the battery cell, the resistance of the PTC element abruptly increases with the increase of the temperature, whereby the PTC element cuts itself off or only a small amount of current flows through the PTC element. Consequently, The PTC element serves to suppress the increase in internal pressure of the battery due to the overheating of the battery.

In the battery pack including the PTC element, for example, the PCM having the external input and output terminal is connected to a cathode terminal and an anode terminal via conductive nickel plates by welding or soldering, and the PTC element attached to the nickel plates at the top and bottom thereof are electrically connected to the PCM and the electrode terminals of the battery cell.

In order to assemble the battery pack with the above-stated construction, however, several welding or soldering processes are required to achieve the electrical connection between the PTC element and the PCM and between the PTC element and the electrode terminals. Furthermore, since the PTC element is connected to the PCM and the battery cell, it is required for the nickel plates to have a large length. The long nickel plates must be bent such that the PCM is loaded on the battery cell, with the result that a dead space corresponding to the bent space is formed, and therefore, the volume density of the battery pack relatively decreases as compared with other battery packs having the same standard.

For the above-mentioned reason, in a method of mounting elements on a board to manufacture the PCM, there has been developed a technology for manufacturing a very thin PCM using a chip-on-board technology to reduce the overall volume of the battery pack and loading the PCM on the top of the battery pack. However, the PCM manufactured using the chip-on-board technology is higher in price that a PCM manufactured according to the conventional art, with the result that the manufacturing costs of the battery pack increases.

Therefore, research has been actively made on various technologies for efficiently utilizing the space at the upper end of the battery pack in which the PCM is loaded to easily assemble an insulative mounting member and a safety element loaded on the top of the battery cell and, at the same time, not to increase the overall volume of the battery pack even when using a battery pack including the PCM manufactured according to the conventional art.

In connection with this matter, for example, Korean Patent Application Publication No. 2007-0097143 discloses a secondary battery including an electrode assembly constructed in a structure in which two different electrodes are wound while a separator is disposed between the two electrodes, a container in which the electrode assembly is mounted, and a cap assembly coupled to an open top of the container, wherein an insulation case is mounted between the electrode assembly and the cap assembly, and the insulation case is provided with a first groove for receiving at least partially a downward protruding region of the cap assembly.

However, the first groove formed at the insulation case is provided to prevent the bending deformation of the insulation case and to minimize an unnecessary space between the cap assembly and the insulation case. As a result, the first groove does not allow the insulative mounting member and the safety element to be easily assembled or does not give a space sufficient for all the elements of the PCM to be introduced thereinto. Consequently, it is difficult to efficiently utilize the space at the upper end of the battery pack. Also, the safety elements, including the PCM, are connected to the electrode terminals of the battery cell by welding or soldering, with the result that the battery pack assembling process is complicated.

Consequently, there is a high necessity for a technology that is capable of reducing the number of members mounted to the top of the battery ell to simplify the assembling process, achieving the connection between the PCM and the insulative mounting members in a no-welding manner, and mounting the safety elements, such as the relatively thick PCM and the PTC element, to the top of the battery pack while not increasing the thickness of the battery pack.

SUMMARY OF THE INVENTION

Therefore, the present invention has been made to solve the above problems, and other technical problems that have yet to be resolved.

Specifically, it is an object of the present invention to provide a secondary battery pack constricted in a structure in which a predetermined depression space is formed at a top cap, thereby increasing the spatial efficiency at the upper end of the battery pack.

It is another object of the present invention to provide a secondary battery pack constructed in a structure in which a battery cell and a protection circuit module and an insulative mounting member are coupled to a battery cell through a specific coupling structure, thereby greatly simplifying an assembling process and providing excellent structural stability according to improved coupling strength.

It is a further object of the present invention to provide a secondary battery pack exhibiting high spatial efficiency and excellent structural stability through a structure in which a positive temperature coefficient (PTC) element is mounted in the depression space.

In accordance with one aspect of the present invention, the above and other objects can be accomplished by the provision of a secondary battery pack including a battery cell having an electrode assembly mounted in a battery case together with an electrolyte, the battery case having an open top sealed by a top cap, a protection circuit module having a protection circuit for controlling overcharge, overdischarge, and overcurrent of the battery cell, an insulative mounting member constructed in a structure in which the protection circuit module is loaded at a top of the insulative mounting member, the insulative mounting member being mounted to the top cap of the battery cell, and an insulative cap coupled to an upper end of the battery cell for covering the insulative mounting member in a state in which the protection circuit module is loaded on the insulative mounting member, wherein the top cap is provided with at least one protrusion-type electrode terminal, and the top cap is provided at a partial region where the protrusion-type electrode terminal is not formed with a space (depression space) depressed downward by a predetermined depth for allowing elements loaded on a bottom of the protection circuit module to be received therein or a positive temperature coefficient (PTC) element to be mounted therein.

According to the present invention, the depression space having the predetermined depth is formed at the top cap, and therefore, it is possible to secure a space in which the elements loaded on the bottom of the protection circuit module (PCM) are received or the PTC element, having predetermined volume, are mounted. Consequently, it is possible to manufacture the secondary battery pack in a more compact structure.

Preferably, the insulative mounting member is provided with a through-hole (a first through-hole) corresponding to the protrusion-type electrode terminal and a through-hole (a second through-hole) corresponding to the depression space, the PCM is provided with a coupling through-hole corresponding to the first through-hole, and the coupling of the insulative mounting member and the PCM to the battery cell is achieved by successively fixedly inserting the protrusion-type electrode terminal through the first through-hole of the insulative mounting member and the coupling through-hole of the PCM.

That is in the above-described structure, the protrusion-type electrode terminal has length efficient to pass through the first through-hole of the insulative mounting member and the coupling through-hole of the PCM in a state in which the insulative mounting member and PCM are loaded on the battery cell.

In this structure, the coupling of the insulative mounting member and the PCM to the battery cell is achieved by successively fixedly inserting the protrusion-type electrode terminal formed at the top cap through the first through-hole of the insulative mounting member and the coupling through-hole of the PCM. Consequently, the assembly of the secondary battery pack is achieved in a simple coupling fashion.

Furthermore, the insulative mounting member and the PCM are configured in a structure in which the secure mechanical coupling between the insulative mounting member and the PCM is easily achieved. Consequently, the manufacturing process is greatly simplified and a coupling structure very stable against external impact or vibration is provided, as compared with the conventional secondary battery pack constructed in a structure requiring several welding or soldering processes.

As previously described, the elements loaded on the bottom of the PCM may be received, or the PTC element may be mounted, in the depression space.

In an exemplary example, therefore, the elements loaded on the bottom of the PCM may be received in the depression space in a state in which the PCM is loaded on the insulative mounting member. In this case, the elements loaded on the bottom of the PCM may be received in the depression space through the second through-hole of the insulative mounting member.

In another exemplary example, the PTC element may be mounted in the depression space, and the PTC element has one side electrically connected to the PCM and the other side electrically connected to an electrode terminal of the battery cell.

In the secondary battery pack according to the present invention, it is required for the battery case to exhibit easy processability and a mechanical strength of a predetermined level or more. For this reason, the battery case may be a metal container. Preferably, the battery case is an aluminum container.

The depression space formed at the top cap may have various shapes. The shape of the depression space is not particularly restricted as long as the elements loaded on the bottom of the PCM can be received, or the PTC element can be mounted, in the depression space. For example, the depression space may be formed in the plan shape of a rectangle having four rounded corners. The depression space having this shape is preferable because the elements loaded on the bottom of the PCM are the most easily received, or the PTC element is the most easily mounted, in the depression space, while the depression space is not in contact with the electrode assembly located below the top cap.

In an exemplary example, the depression space may be formed by plastically deforming a portion of the top cap by a predetermined depth. For example, the depression space may be formed by deep drawing, such that the depression space is depressed downward by a predetermined depth, when manufacturing the top cap.

Specifically, the depression space may have a depth of preferably 0.1 to 1.0 mm, more preferably 0.3 to 0.6 mm, such that the depression space does not come into contact with the electrode assembly in the battery cell.

When forming the depression space by deep drawing such that the depression space has a depth of 1.0 mm or more, tensile deformation increases, with the result that the corners of the depression space become thin, and a crack occurs in the material constituting the top cap. Consequently, the strength of the stretched region of the top cap may greatly decrease, or the top cap may break in the end, which leads to product defect.

In another exemplary example, the depression space may be formed by coupling a plate-shaped sealing member to the lower end of a through-hole formed by bending a corresponding region of the top cap downward by a predetermined depth.

In this structure, it is possible to adjust the depth of the depression space as needed, and therefore, it is possible to easily receive the elements of the PCM having large height, or easily mount the PTC element having large height, in the depression space. The coupling between the lower end of the downward-bent through-hole and the plate-shaped sealing plate may be achieved, preferably, by welding. Consequently, the depression space may have a depth of, for example, 0.5 to 2.0 mm, preferably 0.6 to 1.5 mm, within a range in which the plate-shaped sealing plate does not come into contact with the electrode assembly.

The material for the plate-shaped sealing plate is not particularly restricted. The plate-shaped sealing plate may be made of a material identical to or different from the battery case. Also, the plate-shaped sealing plate may be made of a conductive material or an insulative material.

In the structure in which the protrusion-type electrode terminal is fixedly inserted through the first through-hole of the insulative mounting member and the coupling through-hole of the PCM, as previously described, the protrusion-type electrode terminal may be fixed in various manners after the protrusion-type electrode terminal is inserted through the first through-hole of the insulative mounting member and the coupling through-hole of the PCM. The fixing of the protrusion-type electrode terminal is not particularly restricted as long as the coupling of the protrusion-type electrode terminal to the first through-hole of the insulative mounting member and the coupling through-hole of the PCM is improved, and the electrical connection between the protrusion-type electrode terminal and the PCM is achieved.

In an exemplary example, the end of the protrusion-type electrode terminal may protrude from the top of the PCM by a predetermined length, and the end of the protrusion-type electrode terminal is pressed to be fixed to the PCM.

For example, when the protrusion-type electrode terminal is formed of a conductive rivet, the coupling of the insulative mounting member and the PCM to the battery cell and the electrical connection between the PCM and the electrode terminal of the battery cell are simultaneously achieved by a series of simple processes including forming the conductive rivet at the top cap, successively inserting the rivets through the first through-hole of the insulative mounting member and the coupling through-hole of the PCM, and pressing the end of the electrode terminal protruding from the top of the PCM. Pressing the end of the protrusion-type electrode terminal further increases the strength of the coupling of the insulative mounting member and the PCM to the battery cell.

In another example, the protrusion-type electrode terminal may be configured in a structure in which, when the protrusion-type electrode terminal is inserted through the first through-hole of the insulative mounting member and the coupling through-hole of the PCM, the end of the protrusion-type electrode terminal protrudes from the top of the PCM by a predetermined length, and then the end of the protrusion-type electrode terminal is fixed to the PCM in a mechanical coupling fashion. The mechanical coupling of the PCM to the protruding end of the protrusion-type electrode terminal may be achieved in various manners. In an exemplary example, the mechanical coupling of the PCM to the protruding end of the protrusion-type electrode terminal may be achieved by the threaded engagement based on a female-screw and male-screw structure.

The battery cell includes a cathode terminal and an anode terminal. Preferably, the top cap is provided with a pair of protrusion-type electrode terminals (a first protrusion-type electrode terminal and a second protrusion-type electrode terminal).

The protrusion-type electrode terminals not only fixedly couple the PCM and the insulative mounting member to the upper end of the battery cell but also allow the battery cell to be easily manufactured and to simplify the structure of the battery cell.

For example, at least one of the protrusion-type electrode terminals may be configured in a hollow structure including a through-channel communicating with the interior of the battery case. The through-channel may be used as an electrolyte injection port, through which an electrolyte is injected, after the electrode assembly is mounted in the battery case, during the manufacture of the battery cell.

Since at least one of the protrusion-type electrode terminals may be used as the electrolyte injection port, there is no need to form an additional electrolyte injection port at the top cap unlike conventional battery cells. Consequently, the through-channel may be sealed, for example, by a metal ball after being used as the electrolyte injection port.

Also, in the structure in which the ends of the electrode terminals are fixed to the PCM in the mechanical coupling fashion, for example, each of the protrusion-type electrode terminals may be provided at the end thereof with a thread part. In this case, the end of each of the protrusion-type electrode terminals may be threadedly engaged into a nut, in a state in which the ends of the protrusion-type electrode terminals protrude from the top of the PCM, thereby achieving the mechanical coupling between the protrusion-type electrode terminals and the PCM.

The protrusion-type electrode terminals are variously applicable irrespective of the kind and external shape of battery cells. For a prismatic battery cell, for example, the first protrusion-type electrode terminal may be connected to the cathode of the battery cell while being electrically connected to the top cap, and the second protrusion-type electrode terminal may be connected to the anode of the battery cell while being electrically isolated from the top cap. Consequently, it is possible for the first protrusion-type electrode terminal to serve as a cathode terminal and for the second protrusion-type electrode terminal to serve as an anode terminal.

As an example of the above-described structure, the top cap may be provided with a through-hole, the first protrusion-type electrode terminal may be integrally formed with the top cap, and the second protrusion-type electrode terminal may include a plate-shaped main body, an upper extension extending upward from the main body such that the upper extension is perpendicular from the main body, and a lower extension extending downward from the main body such that the lower extension is perpendicular from the main body, the lower extension being configured to be inserted through the through-hole of the top cap, whereby the second protrusion-type electrode terminal being coupled to the top cap by pressing the end of the lower extension.

In a structure in which the first protrusion-type electrode terminal serves as the anode, for example, the first protrusion-type electrode terminal, integrally formed with the top cap, may be formed simultaneously when pressing the top cap. Of course, however, the protrusion-type electrode terminal may be separately prepared, and then the protrusion-type electrode terminal may be coupled to the top cap. For example, the protrusion-type electrode terminal may be coupled to the top cap by welding. In consideration of productivity, however, it is more preferable to form the protrusion-type electrode terminal using the former method, i.e., to form the protrusion-type electrode terminal simultaneously when pressing the top cap.

Also, in a structure in which the second protrusion-type electrode terminal serves as the cathode, the second protrusion-type electrode terminal is more easily and stably coupled to the top cap by the coupling structure between the top cap and the second protrusion-type electrode terminal as described above, and the coupling of the PCM and the insulative mounting member to the battery cell is more securely and stably achieved by the upper extension and the lower extension of the second protrusion-type electrode terminal.

On the other hand, in a structure in which the second protrusion-type electrode terminal serves as the anode, for example, an electrically insulative gasket may be mounted at an interface between the second protrusion-type electrode terminal and the through-hole of the top cap for achieving the insulation between the second protrusion-type electrode terminal and the top cap serving as the cathode.

The structure of the protrusion-type electrode terminals is not particularly restricted as long as the protrusion-type electrode terminals are easily electrically connected to the PCM. Also, the structure of the depression space is not particularly restricted as long as the elements of the PCM are effectively received, or the PTC element is effectively mounted, in the depression space. Preferably, the protrusion-type electrode terminals are located at opposite sides of the top cap, and the depression space is located between the protrusion-type electrode terminals.

Also, the material for the protrusion-type electrode terminals is not particularly restricted as long as the protrusion-type electrode terminals are made of a highly conductive material. Preferably, the protrusion-type electrode terminals are made of a steel coated with copper (Cu), nickel (Ni), and/or chrome (Cr), stainless steel, aluminum (Al), an Al alloy, an Ni alloy, a Cu alloy, or a Cr alloy. When the protrusion-type electrode terminals are integrally formed with the top cap, it is natural that the protrusion-type electrode terminals are made of the same material as the top cap.

Meanwhile, in a structure in which the PTC element is mounted in the depression space, as previously described, one side of the PTC element is electrically connected to the PCM, and the other side of the PTC element is electrically connected to a corresponding electrode terminal of the battery cell. Consequently, the PCM, electrically connected to the external input and output terminal, is electrically connected to the battery cell via the PTC element, and therefore, when the internal temperature of the battery increases, the PTC element interrupts the flow of current in the PCM circuit, thereby achieving the disconnection between the battery cell and the external input and output terminal.

The electrical connection between the PTC element and the electrode terminal of the battery cell and/or the electrical connection between the PTC element and the PCM is not particularly restricted. For example, the electrical connection between the PTC element and the electrode terminal of the battery cell and/or the electrical connection between the PTC element and the protection circuit module may be achieved by direct coupling or indirect coupling using a conductive connection member. The connection member may be made of a variable conductive material. Preferably, the connection member is formed of a nickel plate.

The electrode terminal of the battery cell may be constituted by the battery case. In an exemplary example, the battery case may be formed of a metal container, and the battery case may be electrically connected to a cathode tab or an anode tab of the electrode assembly to constitute an electrode terminal (a).

When the battery case constitutes the electrode terminal (a), and the depression space is formed by deforming the top cap, the depression space also constitutes the electrode terminal (a). Consequently, the bottom of the PTC element may be directly coupled to the lower end of the depression space such that the bottom of the PTC element is electrically connected to the electrode terminal (a).

When the PTC element is directly coupled to the depression space, it is possible to reduce the number of conductive connection members. The coupling between the bottom of the PTC element and the depression space is not particularly restricted. For example, the coupling between the bottom of the PTC element and the depression space may be achieved by conductive bonding, welding, or soldering. Preferably, the coupling between the bottom of the PTC element and the depression space is achieved by soldering.

Also, the electrode terminal of the battery cell, to which the PTC element is electrically connected, may be an electrode terminal (b) electrically isolated from the battery case and coupled to an electrode having polarity opposite to that connected to the battery case. The electrical connection between the electrode terminal (b) and the PTC element may be achieved by an additional conductive connection member.

In a concrete example, when the depression space constitutes the electrode terminal (a), and the PTC element is electrically connected to the electrode terminal (b), an insulation film may be attached, or an insulation layer may be applied, to the depression space, and the PTC element may be loaded on the insulation film or the insulation layer, thereby achieving the electrical isolation between the PTC element and the electrode terminal (b). The coupling between the PTC element and the electrode terminal (b) may be achieved by a conductive connection member. At this time, it is required for the conductive connection member to be electrically isolated from the electrode terminal (a). This electrical isolation may be achieved, for example, by insulation film, resin, rubber, or an insulative coating layer.

Meanwhile, the top of the PTC element may be electrically connected to the PCM via another conductive connection member. The material for the connection member is not particularly restricted as long as the connection member is made of a variable conductive material. Preferably, the connection member is formed of a nickel plate.

According to circumstances, the electrical connection between the PTC element and the protrusion-type electrode terminal may be achieved by an additional conductive connection member, and the conductive connection member may be coupled to the protrusion-type electrode terminal by welding. Alternatively, the electrical connection between the PTC element and the protrusion-type electrode terminal may be achieved by inserting the conductive connection member between the protrusion-type electrode terminal and the gasket, which will be described hereinafter in detail with reference to the accompanying drawings.

In the secondary battery pack according to the present invention, the insulative cap serves to protect the battery cell from external impact, complement the mechanical strength of the members mounted at the top of the battery cell, and maintain the electrical insulation between the members. Preferably, the insulative cap extends downward by a predetermined length such that at least a portion of the insulative cap covers the outside surface of the upper end of the battery cell in a state in which the insulative cap is mounted to the upper end of the battery cell, thereby improving the coupling to the battery cell. In order to maximize such an effect, the downward extension of the insulative cap is preferably joined to the outer surface of the upper end of the battery cell by bonding or by mechanical coupling. According to circumstances, an adhesive may be applied between the top cap and the insulative mounting member such that the insulative mounting member is more stably mounted to the top cap.

In addition to the insulative cap coupled to the upper end of the battery cell, an additional insulative cap (a bottom cap) may be also mounted to the lower end of the battery cell. Also, a sheathing film may be attached to the outer surface of the battery case of the battery cell. Consequently, the battery cell may be protected from external impact, and the electrical insulation of the battery cell may be maintained, by the provision of the sheathing film. Preferably, the sheathing film is attached to the outer surface of the battery case such that the sheathing film covers the lower extension of the insulative cap.

The secondary battery pack according to the present invention may be applicable in various manners irrespective of the kind and appearance of the battery cell. Preferably, the battery cell is a prismatic battery having an electrode assembly of a cathode/separator/anode structure mounted in a prismatic metal container.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
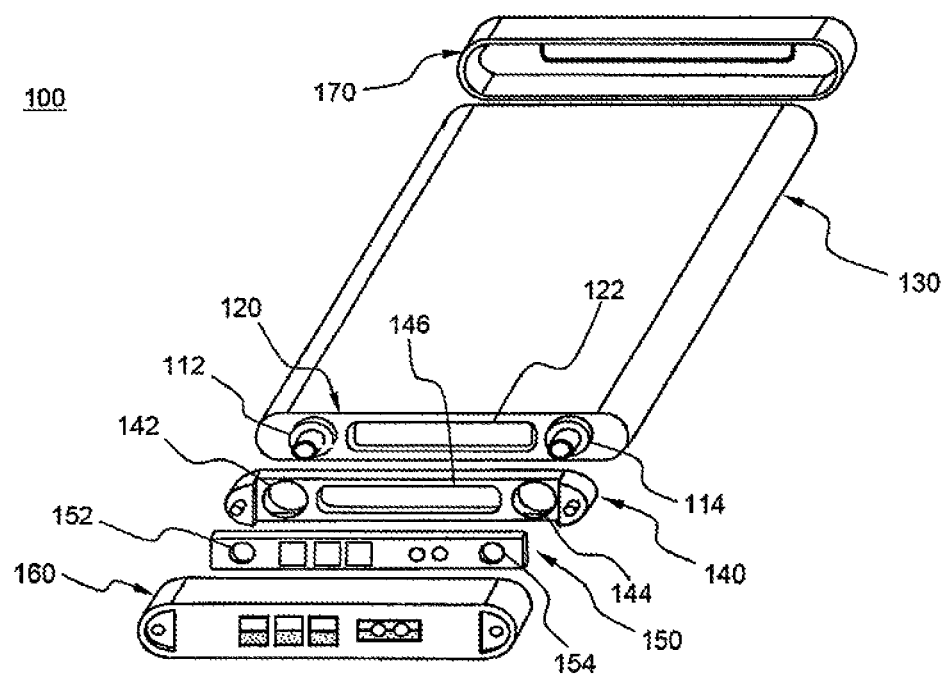
FIG. 1 is an exploded perspective view illustrating a secondary battery pack according to an embodiment of the present invention.
Figure 2:
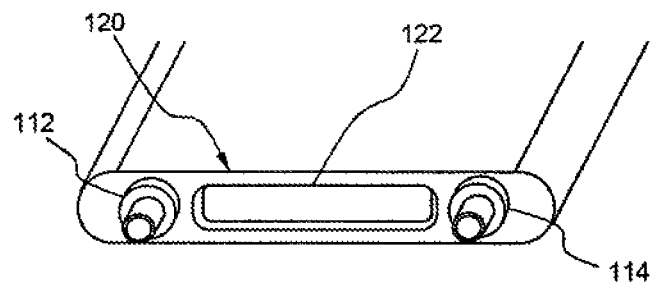
FIG. 2 is a partially enlarged view typically illustrating a top cap region of a battery cell shown in FIG. 1.

FIG. 1 is an exploded perspective view illustrating a secondary battery pack according to an embodiment of the present invention, and FIG. 2 is a partially enlarged view typically illustrating a top cap region of a battery cell shown in FIG. 1.

Referring to these drawings, the secondary battery pack 100 according to this embodiment includes a battery cell 130 having an electrode assembly received in a battery case together with an electrolyte, a top cap 120 for sealing the top, which is open, of the battery case, a plate-shaped protection circuit module (PCM) 150 having a protection circuit formed thereon, an insulative mounting member 140 mounted to the top cap 120 of the battery cell 130, an insulative cap 160 coupled to the upper end of the battery cell 130 for covering the insulative mounting member 140 in a state in which the PCM 150 is loaded on the insulative mounting member 140, and a bottom cap 170 mounted to the lower end of the battery cell 130.

The battery cell includes a first protrusion-type electrode terminal 112 and a second protrusion-type electrode terminal 114 protruding upward from opposite sides of the upper end of the top cap 120. Also, a depression space 122, depressed downward by a predetermined depth, is formed at the top cap 120 between the protrusion-type electrode terminals 112 and 114. Elements loaded at the bottom of the PCM 150 may be located in the depression space 122.

The insulative mounting member 140 is provided with first through-holes 142 and 144 having a shape and size corresponding to the lower ends of the protrusion-type electrode terminals 112 and 114 and a second through-hole 146 having a shape corresponding to the depression space 122. The PCM 150 is provided with coupling through-holes 152 and 154 having a shape and size corresponding to the upper ends of the protrusion-type electrode terminals 112 and 114.

The first protrusion-type electrode terminal 112 is connected to a cathode (not shown) of the battery cell 130 while being electrically connected to the top cap 120. The second protrusion-type electrode terminal 114 is connected to an anode (not shown) of the battery cell 130 while being electrically isolated from the top cap 120.

The coupling of the insulative mounting member 140 and the PCM 150 to the battery cell 130 is achieved by inserting the protrusion-type electrode terminals 112 and 114 through the first through-holes 142 and 144, located at the opposite sides of the insulative mounting member 140, and the coupling through-holes 152 and 154, located at the opposite sides of the PCM 150, and pressing the ends of the protrusion-type electrode terminals 112 and 114. Also, the coupling of the insulative mounting member 140 to the top cap 120 may be further secured by an adhesive as needed.

The protrusion-type electrode terminals 112 and 114 are electrically connected to a circuit of the PCM 150 while being coupled to the PCM 150.

The insulative cap 160 is coupled to the upper end of the battery cell 130 for covering the insulative mounting member 140 in a state in which the PCM 150 is loaded on the insulative mounting member 140. The insulative cap 160 extends downward by a predetermined length to cover the outside of the upper part of the battery cell 130. The bottom cap 170 is mounted to the lower end of the battery cell 150.

Figure 3:
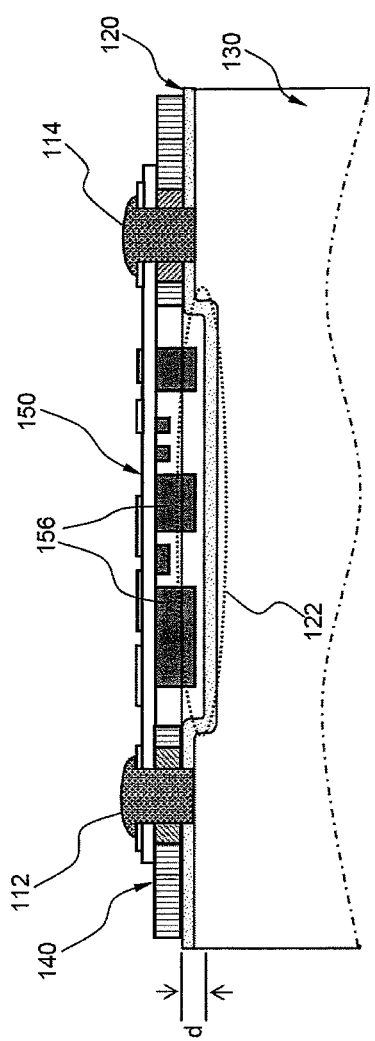
FIG. 3 is a vertical sectional view typically illustrating the upper part of the secondary battery pack shown in FIG. 1 in a state in which the secondary battery pack is assembled.

FIG. 3 is a vertical sectional view typically illustrating the upper part of the secondary battery pack shown in FIG. 1 in a state in which the secondary battery pack is assembled.

Referring to FIG. 3 together with FIG. 1, the top cap 120, the insulative mounting member 140, and the PCM 150 are sequentially mounted at the upper part of the battery cell 130. Elements 156 mounted at the bottom of the PCM 150 are received in the depression space 122, which is depressed downward from the upper end of the top cap 120 by a predetermined depth d. Consequently, the height of the battery pack decreases as the elements 156 of the PCM 150 are introduced into the depression space 122 of the top cap 120. As a result, the size of the battery cell 130 is increased as much as the decreased dead space as compared to other battery packs having the same standard, whereby it is possible to increase the capacity of the battery as much as that. The depression space 122 may be formed, for example, by deep drawing when manufacturing the top cap 120 by pressing.

Although simply illustrated in FIG. 3, the second protrusion-type electrode terminal 114 is mounted such that the second protrusion-type electrode terminal 114 is electrically isolated from the top cap 120. This structure will be equally applied in FIG. 4, which will be described hereinafter.

Figure 4:
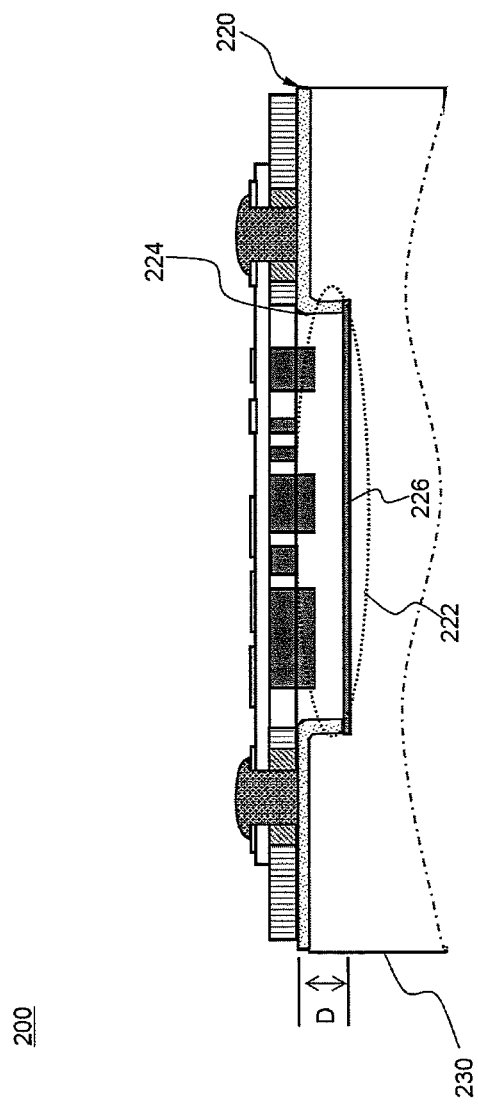
FIG. 4 is a vertical sectional view typically illustrating the upper part of the secondary battery pack in a structure in which a depression space shown in FIG. 3 is deformed.

FIG. 4 is a vertical sectional view typically illustrating the upper part of the secondary battery pack in a structure in which the depression space shown in FIG. 3 is deformed.

Referring to FIG. 4, a depression space 222 is formed by a through-hole 224 bent downward, by a predetermined depth D from a predetermined region located at the central part of the top cap 220 and a plate-shaped sealing member 226 coupled to the lower end of the through-hole 224 by welding. The depth of the depression space 222 with the above-stated construction is greater than that of the depression space 122 of FIG. 3. The depression space 222 is particularly preferable when it is not possible to form a deep depression shape due to the limit of the deep drawing with respect to the top cap 220.

Figure 5:
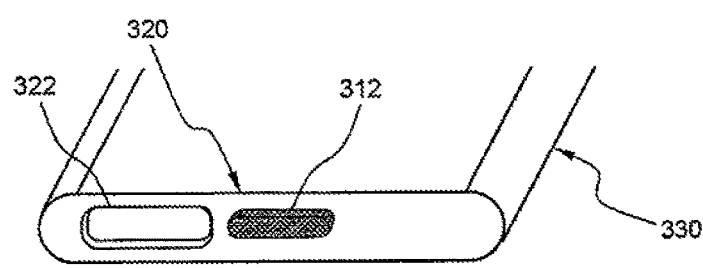
FIG. 5 is a partially enlarged view typically illustrating a top cap region of a battery cell according to another embodiment of the present invention.

FIG. 5 is a partially enlarged view typically illustrating a top cap region of a battery cell according to another embodiment of the present invention.

Referring to FIG. 5, only an anode terminal 312 protrudes upward from a top cap 320 mounted at the upper end of the battery cell 330, and the top cap 320 is provided at one side thereof with a depression space 322 depressed downward by a predetermined depth such that elements loaded at the bottom of a PCM (not shown) are received in the depression space 322.

Figure 6:
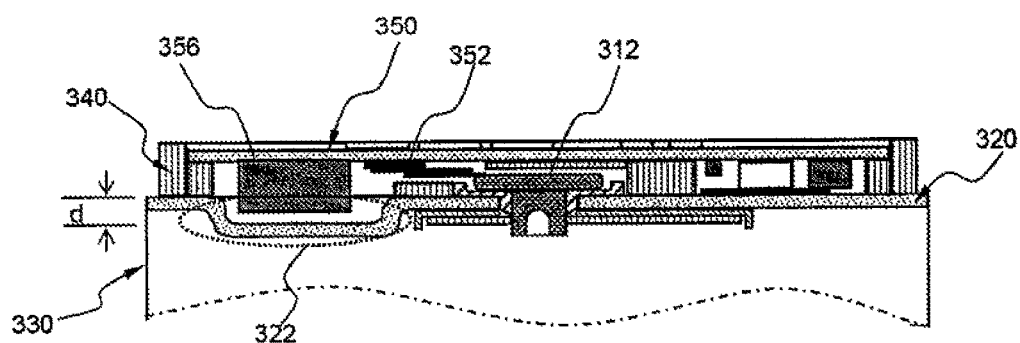
FIGS. 6 and 7 are vertical sectional views typically illustrating shapes of the upper part of a secondary battery pack that can be considered in the battery cell structure shown in FIG. 5.
Figure 7:
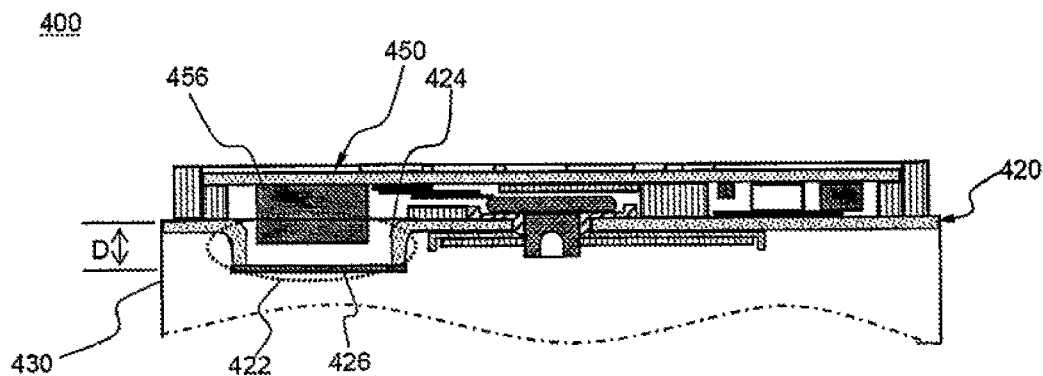

FIGS. 6 and 7 are vertical sectional views typically illustrating shapes of the upper part of a secondary battery pack that can be considered in the battery cell structure shown in FIG. 5. In the battery pack shown in FIGS. 6 and 7, the protrusion-type electrode terminals are not coupled to the PCM, unlike FIGS. 1 to 4.

Referring first to FIG. 6, an anode terminal 312 protrudes upward from a central region of the top of a battery cell 330, and the upper part of the anode terminal 312 is electrically connected to a PCM 350 via a nickel plate 352. Also, elements 356 mounted to the bottom of the PCM 350 are received in a depression space 322 depressed downward from the upper end of the top cap 320 by a predetermined depth d.

Referring to FIG. 7, a depression space 422 is formed by coupling a plate-shaped sealing member 426 to the lower end of a through-hole 424 bent downward, by a predetermined depth D, from the upper end of a top cap 420 by welding, and elements 456 mounted to the bottom of a PCM 450 are received in the depression space 322.

As compared with the depression space 322 of FIG. 6, the depression space 422 of FIG. 7 has an advantage in that it is possible to more efficiently form a depression shape having increased depth in a space of the top cap 320 limited by the anode terminal 312 located at the central part of the top cap 320, and therefore, a large-sized element 356 can be received in the depression space 422.

Figure 8:
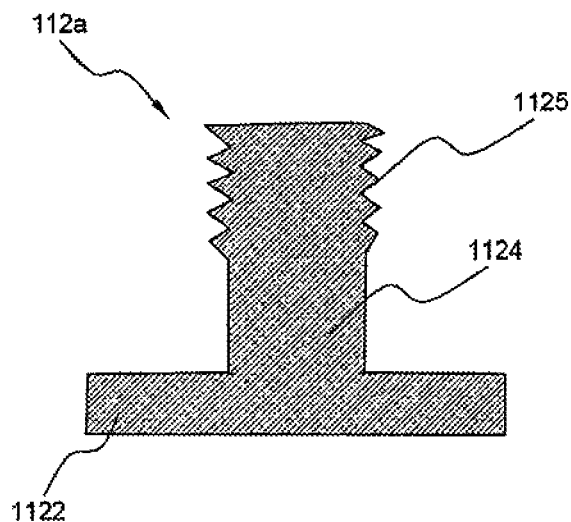
FIGS. 8 and 9 are vertical sectional views typically illustrating exemplary first protrusion-type electrode terminals usable in the secondary battery pack shown in FIG. 1.
Figure 9:
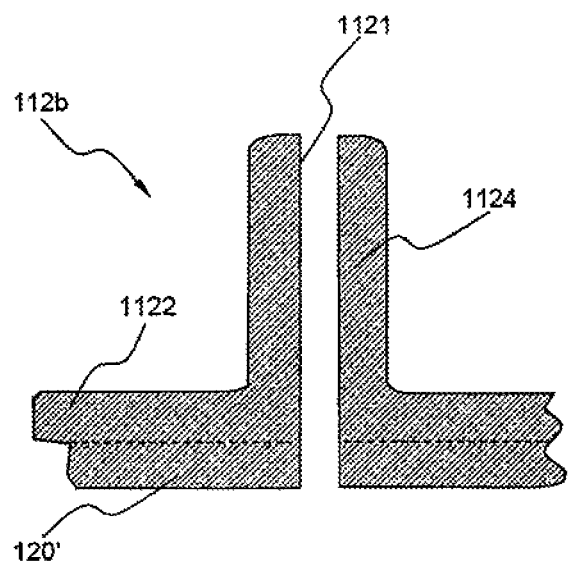

FIGS. 8 and 9 are vertical sectional views typically illustrating exemplary first protrusion-type electrode terminals usable in the battery pack shown in FIG. 1.

Referring to these drawings together with FIG. 1, the first protrusion-type electrode terminal 112a of FIG. 8 is a conductive rivet including a plate-shaped head 1122 and a body 1124 extending perpendicularly from the head 1122. Also, a thread part 1125 is formed at the outer circumference of the end of the body 1124. Consequently, after the first protrusion-type electrode terminal 112a is sequentially inserted through the through-holes 142 and 144 of the insulative mounting member 140 and the coupling through-holes 152 and 154 of the PCM 150, the thread part 1125 provided at the end of the body 1124 may be threadedly engaged into a nut (not shown).

In the first protrusion-type electrode terminal 112b of FIG. 9, the lower end of the head 1122 is integrally formed with a top cap 120'. Consequently, it is possible to reduce the number of parts when manufacturing the battery pack. Also, a through-channel 1121 is formed at the central parts of the head 1122 and the body 1124. The through-channel 1121 may be used as an electrolyte injection port. The first protrusion-type electrode terminal 112b, integrally formed with the top cap 120', may be formed simultaneously when pressing the top cap 120'.

Figure 10:
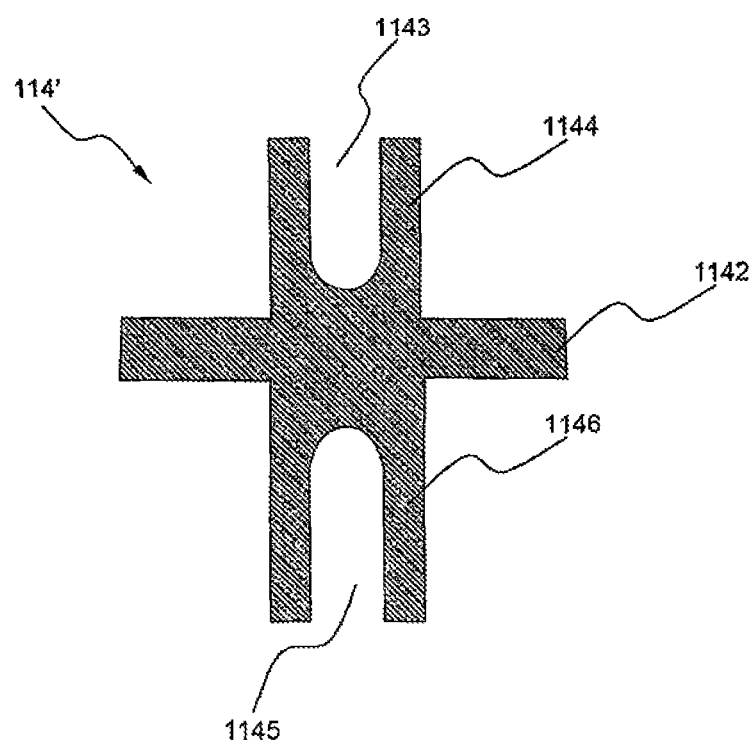
FIG. 10 is a vertical sectional view typically illustrating an exemplary second protrusion-type electrode terminal usable in the secondary battery pack shown in FIG. 1.

FIG. 10 is a vertical sectional view typically illustrating an exemplary second protrusion-type electrode terminal usable in the battery pack shown in FIG. 1.

Referring to FIG. 10, the second protrusion-type electrode terminal 114' includes a plate-shaped main body 1142, an upper extension 1144 extending upward from the main body 1142 such that the upper extension 1144 is perpendicular from the main body 1142, and a lower extension 1146 extending downward from the main body 1142 such that the lower extension 1146 is perpendicular from the main body 1142. The lower extension 1146 is configured to be inserted through a through-hole 126 (FIG. 11) of the top cap 120' (FIG. 11).

Also, depression grooves 1143 and 1145 are formed at the ends of the upper extension 1144 and the lower extension 1146, respectively. Consequently, the ends of the upper extension 1144 and the lower extension 1146 are easily pressed by the provision of the depression grooves 1143 and 1145.

Figure 11:
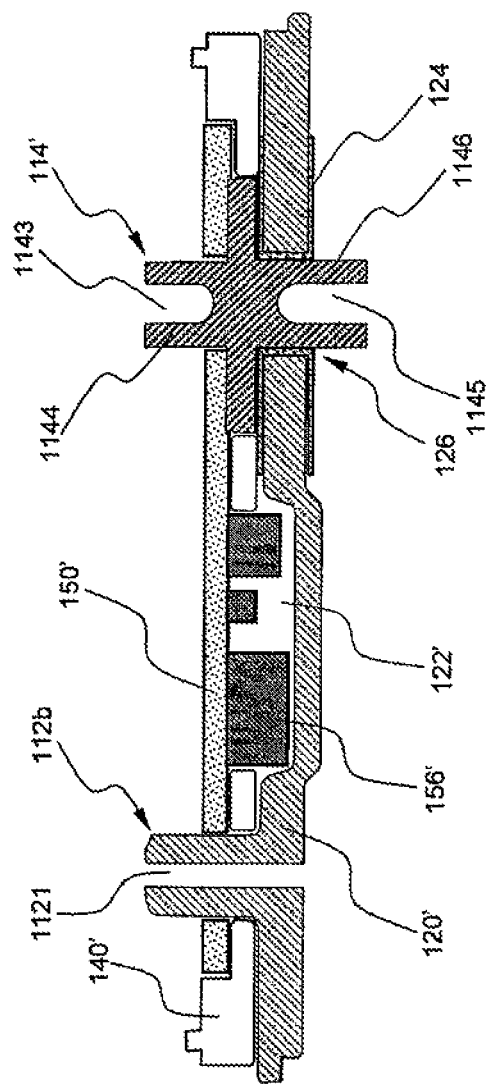
FIG. 11 is a vertical sectional view typically illustrating the upper part of a secondary battery pack according to an embodiment of the present invention.

FIG. 11 is a vertical sectional view typically illustrating the upper part of a secondary battery pack according to an embodiment of the present invention. For easy understanding, protrusion-type electrode terminals are shown in FIG. 11 in a state in which the protrusion-type electrode terminals are not yet pressed.

Referring to FIG. 11, an insulative mounting member 140' and a PCM 150' are sequentially mounted to a top cap 120', which is integrally formed with a first protrusion-type electrode terminal 112b, at the top of the secondary battery pack (not shown).

As previously described, a through-channel 1121, through which an electrolyte is injected, is formed at the central region of the first protrusion-type electrode terminal 112b. Also, the first protrusion-type electrode terminal 112b is integrally formed with the top cap 120'.

On the other hand, a lower extension 1146 of a second protrusion-type electrode terminal 114' is inserted through a through-hole 126 of the top cap 120' from above. At the interface between the second protrusion-type electrode terminal 114' and the top cap 120' is mounted an electrically insulative gasket 124 for achieving the insulation between the second protrusion-type electrode terminal 114' and the top cap 120'. Also, depression grooves 1143 and 1145 are formed at ends of an upper extension 1144 and the lower extension 1146 of the second protrusion-type electrode terminal 114', respectively.

Consequently, when pressing the protruding ends of the first protrusion-type electrode terminal 112b and the second protrusion-type electrode terminal 114', the insulative mounting member 140' and the PCM 150' are securely coupled to the top cap 120'.

Also, a depression space 122' is formed at the top cap 120' between the first protrusion-type electrode terminal 112b and the second protrusion-type electrode terminal 114' such that elements 156' mounted at the bottom of the PCM 150' are received in the depression space 122'. Consequently, it is possible to greatly reduce the overall height of the insulative mounting member 140' and the PCM 150' loaded at the top of the top cap 120'.

Figure 12:
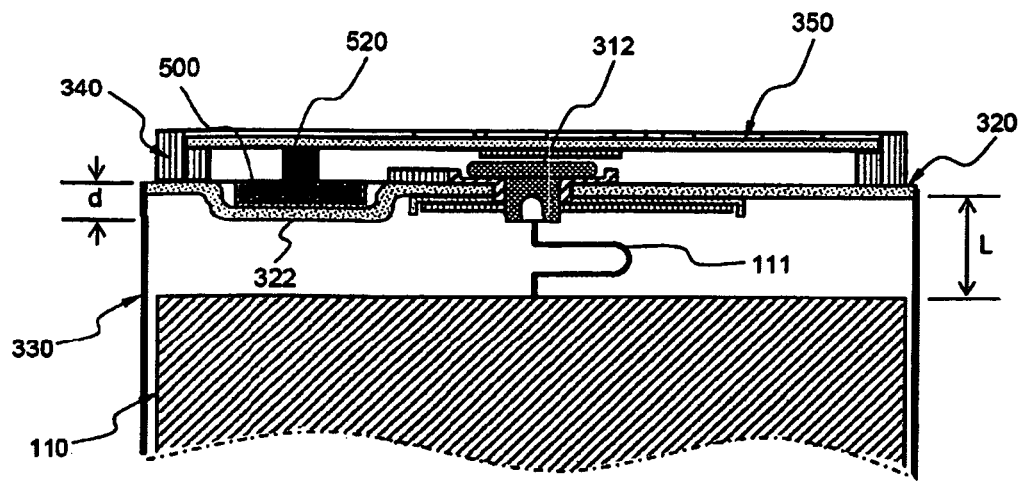
FIGS. 12 and 13 are vertical sectional views illustrating the upper ends of secondary battery packs according to other embodiments of the present invention.
Figure 13:
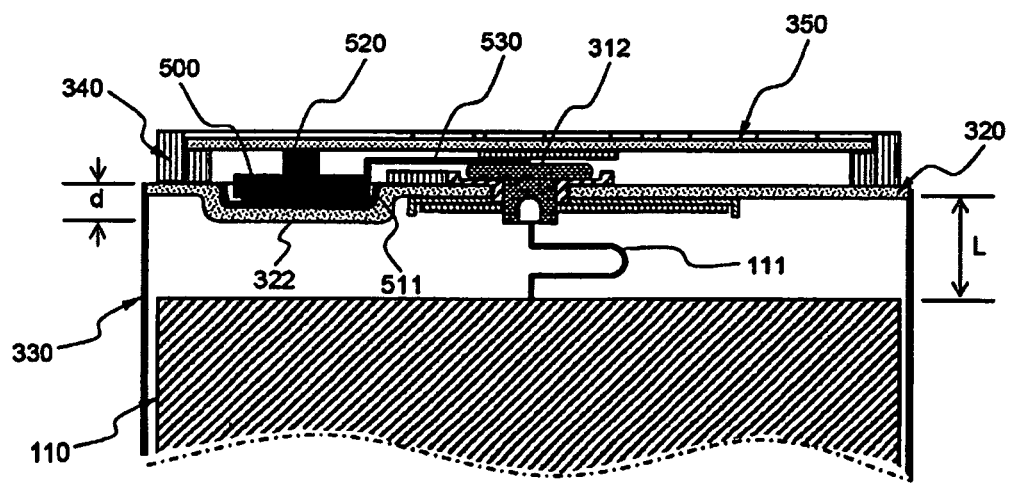

FIGS. 12 and 13 are vertical sectional views illustrating the upper ends of secondary battery packs according to other embodiments of the present invention.

Referring first to FIG. 12, a battery case 330 is made of metal. The battery case 330 is coupled to a cathode tab (not shown) of an electrode assembly 110, and therefore, the battery case 330 constitutes a cathode terminal. Also, a top cap 320, connected to the battery case 330, also constitutes the cathode terminal. An anode tab 111 protrudes upward from a central region of the top of the electrode assembly 110 while being bent. The bent anode tab 111 is connected to an anode terminal 312. By the bending the anode tab 111, a predetermined separation space L is defined between the top of the electrode assembly 110 and the top cap 320.

A depression space 322, formed by plastically deforming a portion of the top cap 320 by deep drawing, constitutes the cathode terminal because the depression space 322 is a portion of the top cap 320, which constitutes the cathode terminal. Consequently, it is possible to easily achieve the coupling between the PTC element 500 and the cathode terminal of the battery cell by directly coupling the PTC element 500 to the depression space 322 by soldering. At this time the electrical connection between the PCM 350 and the PTC element 500 loaded on the insulative mounting member 340 is achieved by welding a connection member 520 attached to the top of the PTC element 500 to the PCM 350. The insulative mounting member includes an inner top surface defining an insulative mounting member recess at which the PCM 350 is loaded such that the PCM 350 fits within the insulative mounting member recess.

On the other hand, an example in which the PTC element 500 is connected to the anode terminal 312 is illustrated in FIG. 13. Referring to FIG. 13, it is required for the PTC element 500 to be electrically isolated from the depression space 322 constituting the cathode terminal. Consequently, an electrical insulating member 511, such as insulation film, resin, rubber, or insulating tape, is disposed between the PTC element 500 and the depression space 322. In a state in which the electrical insulating member 511 is disposed between the PTC element 500 and the depression space 322, the electrical connection between the PTC element 500 and the anode terminal 312 is achieved by a connection member 530 attached to the bottom of the PTC element 500, and the electrical connection between the PCM 350 loaded on the insulative mounting member 340 and the PTC element 500 is achieved by the connection member 520 attached to the top of the PTC element 500.

Figure 14:
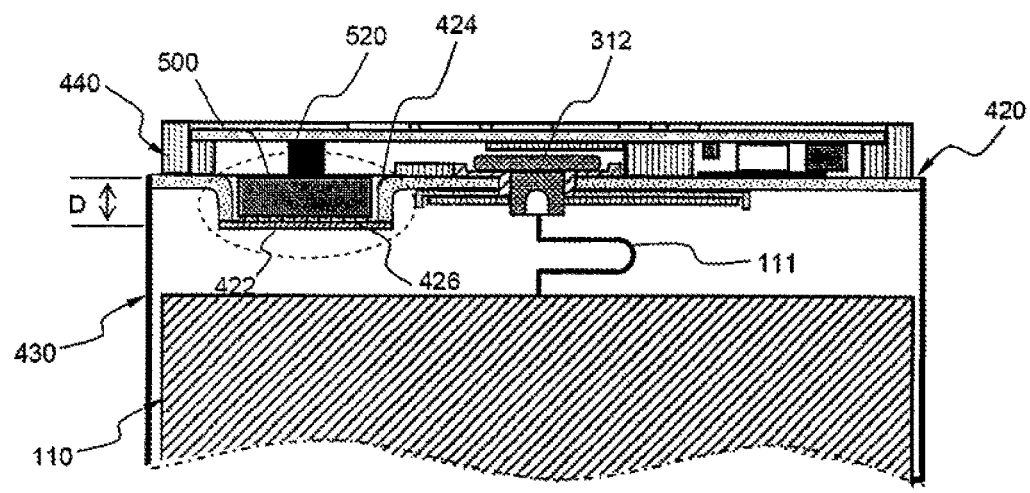
FIG. 14 is a typical view illustrating an example in which the structure of a depression space is deformed in the secondary battery pack shown in FIG. 12.

FIG. 14 is a typical view illustrating an example in which the structure of the depression space is deformed in the battery pack shown in FIG. 12. For reference, the battery pack of FIG. 14 is identical to that of FIG. 12 except the structure of the depression space. Therefore, the other components of the battery pack shown in FIG. 14 are denoted by the same reference numerals as those of the battery pack shown in FIG. 12. The structure of the depression space shown in FIG. 14 is identical to that of the depression space shown in FIG. 7, and therefore, a detailed description of the depression space will not be given.

When the plate-shaped sealing member 426 is made ref a conductive material identical or similar to the top cap 420, the plate-shaped sealing member 426 may be used as the cathode terminal. Consequently, it is possible to achieve the electrical connection between the PTC element 500 and the battery cell by directly coupling the PTC element 500 to the plate-shaped sealing member 426.

On the other hand, when the plate shaped sealing member 426 is made of an insulative material, it is possible to directly mount the PTC element 500 to the plate-shaped sealing member 426, without using an additional insulating member, at the time of connecting the PTC element 500 to the anode terminal 312. At this time, the connection between the PTC element 500 and the anode terminal 3122 may be achieved by attaching an additional connection member (not shown) to the bottom of the PTC element 500 and welding the connection member to the anode terminal 312. However, it is necessary to dispose an insulating member at the region where the through-hole 424, formed by bending the top cap 420 downward, and the connection member, which connects the PTC element 500 and the anode terminal 312 to each other, are in contact with each other.

Figure 15:
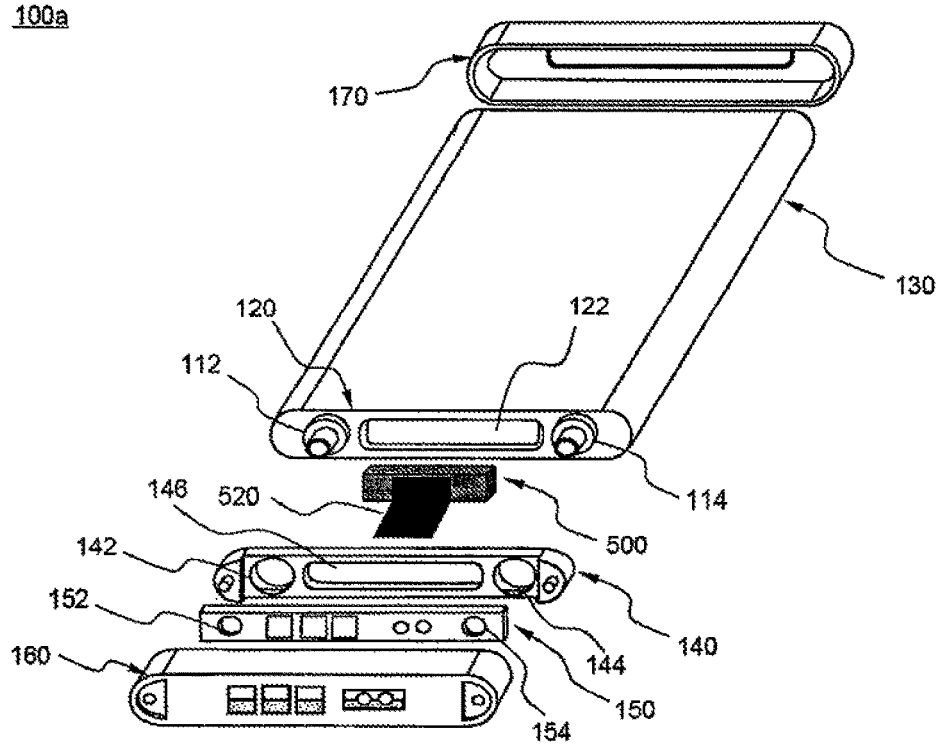
FIG. 15 is an exploded perspective view illustrating a secondary battery pack according to another embodiment of the present invention.

FIG. 15 is an exploded perspective view illustrating a secondary battery pack according to another embodiment of the present invention.

Referring to FIG. 15, the secondary battery pack 100a includes a battery cell 130 having an electrode assembly received in a battery case together with an electrolyte, a top cap 120 for sealing the top, which is open, of the battery case, a plate-shaped PCM 150 having a protection circuit formed thereon, an insulative mounting member 140 mounted to the top cap 120 of the battery cell 130, an insulative cap 160 coupled to the upper end of the battery cell 130 for covering the insulative mounting member 140 in a state in which the PCM 150 is loaded on the insulative mounting member 140, and a bottom cap 170 mounted to the lower end of the battery cell 130.

A pair of protrusion-type electrode terminals 112 and 114, i.e., a first protrusion-type electrode terminal 112 and a second protrusion-type electrode terminal 114, protrude upward from opposite sides of the upper end of the top cap 120. A depression space 122, depressed downward by a predetermined depth, is formed at the top cap 120 between the protrusion-type electrode terminals 112 and 114. Also, a PTC element 500 is mounted in the depression space 122.

In the secondary battery pack 100a with the above-stated construction, the electrical connection between the PTC element 500 and the cathode terminal may be achieved by directly coupling the bottom of the PTC element 500 to the depression space 122 constituting the cathode terminal, as previously described with reference to FIG. 12. Alternatively, the PTC element 500 may be connected to the first protrusion-type electrode terminal 112 is an additional connection member. Meanwhile, the PTC element 500 and the PCM 150 may be electrically connected to each other via the connection member 520 attached to the top of the PTC element 500.

Figure 16:
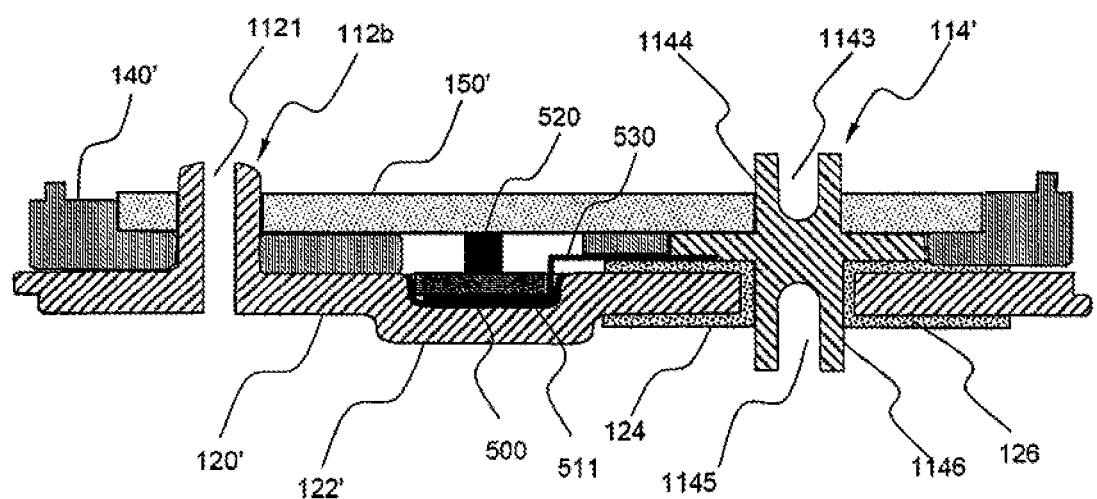
FIG. 16 is a vertical sectional view illustrating the upper end of the secondary battery pack of FIG. 15 to show an exemplary structure related to electrical connection.

On the other hand, an example in which the PTC element 500 is electrically connected to the anode terminal is typically illustrated in FIG. 16.

Referring to FIG. 16, an insulative mounting member 140' and a PCM 150' are sequentially mounted to a top cap 120', which is integrally formed with a first protrusion-type electrode terminal 112b, at the top of an secondary battery pack.

A through-channel 1121, through which an electrolyte is injected, is formed at the central region of the first protrusion-type electrode terminal 112b. The first protrusion-type electrode terminal 112b is integrally formed with the top cap 120'. On the other hand, a lower extension 1146 of a second protrusion-type electrode terminal 114' is inserted through a through-hole of the top cap 120' from above. At the interface between the second protrusion-type electrode terminal 114' and the top cap 120' are mounted electrically insulative gaskets 124 and 126 for achieving the insulation between the second protrusion-type electrode terminal 114' and the top cap 120'. Also, depression grooves 1143 and 1145 are formed at ends of an upper extension 1144 and the lower extension 1146 of the second protrusion-type electrode terminal 114', respectively.

Consequently, when pressing the protruding ends of the first protrusion-type electrode terminal 112b and the second protrusion-type electrode terminal 114', the insulative mounting member 140' and the PCM 150' are stably fixed to the top cap 120'.

The PTC element 500 may be electrically connected to the second protrusion-type electrode terminal 114', constituting the anode terminal, via the connection member 530 attached to the bottom of the PTC element 500 in a state in which an insulation member is disposed in the depression space 122'. Even in this case, the PTC element 500 and the PCM 150' may be electrically connected to each other via the connection member 520 attached to the top of the PTC element 500.

The connection member 530 may be coupled to the second protrusion-type electrode terminal 114' by welding. Alternatively, the electrical connection between the connection member 530 and the second protrusion-type electrode terminal 114' may be stably achieved even in a state in which the connection member 530 is simply inserted between the gaskets 124 and 125 and the second protrusion-type electrode terminal 114' in a tight contact manner. In the latter case, it is possible to omit a welding process, thereby improving process efficiency. Also, an installation space for the connection member 530 is not required, and therefore, it is possible to manufacture the battery in a more compact structure.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery pack according to the present invention is constructed in a structure in which the elements loaded on the bottom of the PCM are received, or the PTC element is mounted, in the depression space formed at the top cap such that the depression space is depressed downward by a predetermined depth. Consequently, it is possible to manufacture a compact high-power secondary battery pack as compared with other battery packs having the same standard.

Also, the secondary battery pack according to the present invention is constructed in a structure in which the coupling between the insulative mounting member and the PCM at the top of the battery pack is achieved, using the protrusion-type electrode terminals of specific structures. Consequently, it is possible to greatly simplify the battery pack assembling process and to improve the structural stability of the battery pack by excellent coupling strength.

Those skilled in the art will appreciate that various modifications, additions and substitutions are possible, without departing from the scope and spirit of the invention as disclosed in the accompanying claims.

What is claimed is:

1. A secondary battery pack comprising:
a battery cell having an electrode assembly mounted in a battery case together with an electrolyte, the battery case having an open top sealed by a top cap;
a protection circuit module having a protection circuit for controlling overcharge, overdischarge, and overcurrent of the battery cell;
a positive temperature coefficient (PTC) element;
an insulative mounting member constructed in a structure in which the protection circuit module is loaded at an inner top surface of the insulative mounting member facing the top cap, the insulative mounting member mounted around the periphery of the top cap of the battery cell, the inner top surface of the insulative mounting member defining an insulative mounting member recess; and
an insulative cap coupled to an upper end of the battery cell for covering the insulative mounting member in a state in which the protection circuit module is loaded at the insulative mounting member, wherein
the top cap is provided with a protrusion electrode terminal,
the protection circuit module fits within the insulative mounting member recess of the insulative mounting member,
the top cap is provided, at a partial region where the protrusion electrode terminal is not formed, with a top cap recess depressed downward towards the electrode assembly by a predetermined depth, the PTC element being mounted in the top cap recess such that the PTC element does not extend beyond the top cap recess,
the PTC element having one side electrically connected to the protection circuit module by a first connection member,
the PTC element is entirely located between the insulative mounting member and the top cap,
the battery case of the battery cell is electrically connected to a cathode tab or an anode tab of the electrode assembly to constitute another electrode terminal, and
a bottom of the PTC element is directly coupled to a lower end of the top cap recess such that the bottom of the PTC element is electrically connected to said another electrode terminal.

2. The secondary battery pack according to claim 1, wherein said one side of the PTC element is a top of the PTC element, the top side being electrically connected to the protection circuit module via the first connection member.

3. The secondary battery pack according to claim 1, where the top cap recess protrudes into a space between an upper end of the battery case and a top of the electrode assembly.

4. The secondary battery pack according to claim 1, wherein the top cap includes a bottom surface, and a portion of the bottom surface corresponding to the top cap recess is closer to the electrode assembly than the remaining portion of the bottom surface.

* * * * *